United States Patent
Henning et al.

(10) Patent No.: US 11,002,881 B2
(45) Date of Patent: May 11, 2021

(54) METHOD AND SYSTEM FOR DETECTION OF INCLEMENT WEATHER THROUGH ENGINE PARAMETERS

(71) Applicant: PRATT & WHITNEY CANADA CORP., Longueuil (CA)

(72) Inventors: Andrea Henning, London (CA); Jasmin Turcotte, Montreal (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 483 days.

(21) Appl. No.: 15/832,086

(22) Filed: Dec. 5, 2017

(65) Prior Publication Data

US 2019/0170902 A1  Jun. 6, 2019

(51) Int. Cl.
| | |
|---|---|
| *G01W 1/06* | (2006.01) |
| *F23N 1/00* | (2006.01) |
| *F02C 7/00* | (2006.01) |
| *F23N 5/00* | (2006.01) |
| *G01W 1/08* | (2006.01) |
| *F23N 5/16* | (2006.01) |
| *B60H 1/00* | (2006.01) |

(52) U.S. Cl.
CPC .......... *G01W 1/06* (2013.01); *B60H 1/00735* (2013.01); *F02C 7/00* (2013.01); *F23N 1/002* (2013.01); *F23N 5/00* (2013.01); *F23N 5/16* (2013.01); *F23N 2231/06* (2020.01); *G01W 1/08* (2013.01)

(58) Field of Classification Search
CPC .......... B60H 1/00735; F02C 7/00; F02C 9/28; F02C 9/46; F05D 2270/092; F05D 2270/096; F05D 2270/301; F05D 2270/303; F23N 1/002; F23N 2231/06; F23N 5/00; F23N 5/16; G01W 1/06; G01W 1/08

See application file for complete search history.

(56) References Cited

U.S. PATENT DOCUMENTS

| | | | | |
|---|---|---|---|---|
| 5,127,173 | A | * | 7/1992 | Thurston ............... G01F 1/3227 73/202 |
| 7,895,818 | B2 | | 3/2011 | Snell et al. |
| 9,447,735 | B2 | | 9/2016 | Gaully et al. |
| 10,071,820 | B2 | * | 9/2018 | Joshi ...................... B64D 27/00 |
| 10,495,006 | B2 | * | 12/2019 | Feulner ................. F01D 17/162 |

(Continued)

OTHER PUBLICATIONS

"Effect of the Atmosphere on the Performances of Aviation Turbine Engines"; by Wtodzimierz Balicki, Pawet Głowacki, Stefan Szczecinski, Ryszard Chachurski, Jerzy Szczeciński; Acta Mechanica et Automatica;Jan. 2014 (Year: 2014).*

*Primary Examiner* — Roy Y Yi
*Assistant Examiner* — Geoffrey T Evans
(74) *Attorney, Agent, or Firm* — Norton Rose Fulbright Canada LLP

(57) ABSTRACT

Systems and methods for detecting inclement weather in the vicinity of an aircraft engine are described herein. At least a first engine parameter and a second engine parameter are obtained, each engine parameter varies with changing weather conditions. An arithmetic value is determined as a function of at least the first engine parameter and the second engine parameter. The arithmetic value varies with changing weather conditions. A rate of change of the arithmetic value is determined. Inclement weather is detected when the rate of change exceeds a threshold.

26 Claims, 5 Drawing Sheets

(56) References Cited

U.S. PATENT DOCUMENTS

| | | | | |
|---|---|---|---|---|
| 2011/0004388 A1* | 1/2011 | Winter | ............ | F01D 17/162 |
| | | | | 701/100 |
| 2011/0054761 A1* | 3/2011 | Sawada | ............ | F02D 41/0085 |
| | | | | 701/103 |
| 2015/0330310 A1* | 11/2015 | deGaribody | ............ | G01F 15/043 |
| | | | | 701/100 |
| 2016/0353523 A1* | 12/2016 | Jarvinen | ............ | F01D 25/02 |
| 2018/0298817 A1* | 10/2018 | Kalya | ............ | F04D 27/009 |

* cited by examiner

METHOD AND SYSTEM FOR DETECTION OF INCLEMENT WEATHER THROUGH ENGINE PARAMETERS

TECHNICAL FIELD

The present disclosure relates generally to detecting inclement weather conditions, and, more particularly, to detecting inclement weather based on engine parameters.

BACKGROUND OF THE ART

An engine flameout refers to unintended shutdown of an engine due to the extinction of flames in the combustion chamber. In some cases, inclement weather conditions may be responsible for an engine flameout, for example due to ingested ice or water during a rain storm and/or a hail storm. For this reason, there are various techniques used to avoid engine flameout.

Many efforts focus on the coping strategies to deal with inclement weather, which may include increasing fuel flow, altering inlet-guide-vanes, adjusting bleed extraction, or a combination thereof. However, the need to properly detect inclement weather, and particularly performing early detection, has largely been overlooked.

SUMMARY

In one aspect, there is provided a method for detecting inclement weather in the vicinity of an aircraft engine, the method comprising: obtaining at least a first engine parameter and a second engine parameter, each engine parameter varying with changing weather conditions; determining an arithmetic value as a function of at least the first engine parameter and the second engine parameter, the arithmetic value varying with changing weather conditions; determining a rate of change of the arithmetic value based on a derivative of the arithmetic value; and detecting inclement weather when the rate of change exceeds a threshold.

In one aspect, there is provided a system for detecting inclement weather in the vicinity of an aircraft engine, the system comprising: at least one processing unit; and a non-transitory computer-readable memory having stored thereon program instructions executable by the at least one processing unit for: obtaining at least a first engine parameter and a second engine parameter, each engine parameter varying with changing weather conditions; determining an arithmetic value as a function of at least the first engine parameter and the second engine parameter, the arithmetic value varying with changing weather conditions; determining a rate of change of the arithmetic value based on a derivative of the arithmetic value; and detecting inclement weather when the rate of change exceeds a threshold.

DESCRIPTION OF THE DRAWINGS

Reference is now made to the accompanying figures in which.

It will be noted that throughout the appended drawings, like features are identified by like reference numerals.

DETAILED DESCRIPTION

There is described herein methods and systems for detecting inclement weather inflight for an aircraft having an engine. Inclement weather refers to any weather condition which includes rain, hail, ice, sleet, snow, freezing rain, and/or a combination thereof.

Figure 1:
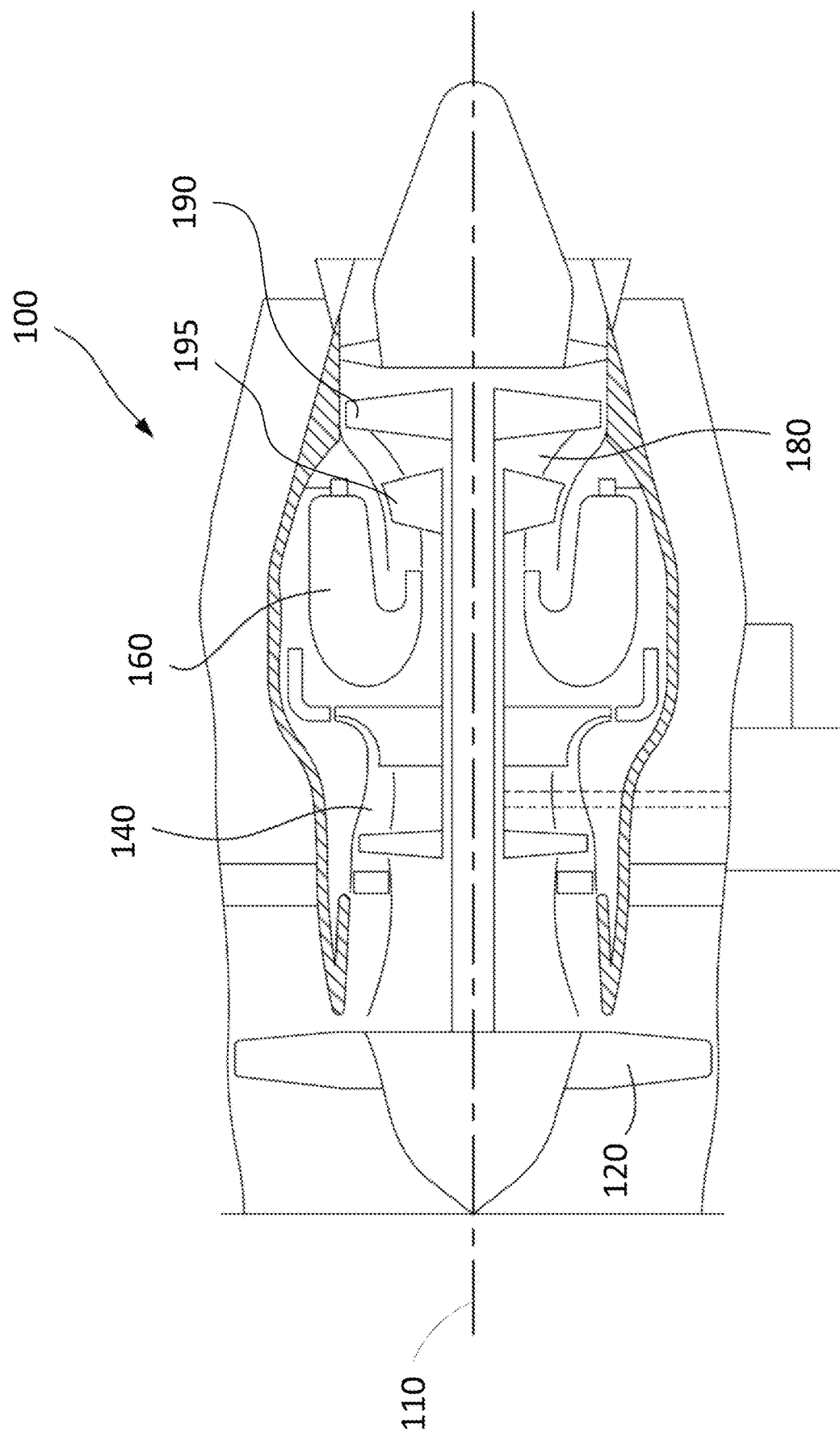
FIG. 1 is a schematic cross-sectional view of an example engine of an aircraft.

FIG. 1 illustrates a gas turbine engine 100 to which the detection methods and systems may be applied. Note that while engine 100 is a turbofan engine, the detection methods and systems may be applicable to turboprop, turboshaft, and other types of gas turbine engines.

Engine 100 generally comprises in serial flow communication: a fan 120 through which ambient air is propelled, a compressor section 140 for pressurizing the air, a combustor 160 in which the compressed air is mixed with fuel and ignited for generating an annular stream of hot combustion gases, and a turbine section 180 for extracting energy from the combustion gases. Axis 110 defines an axial direction of the engine 100. In some embodiments, a low pressure spool is composed of a low pressure shaft and a low pressure turbine. The low pressure shaft drives the propeller 120. A high pressure spool is composed of a high pressure turbine attached to a high pressure shaft, which is connected to the compressor section 140.

Figure 2:
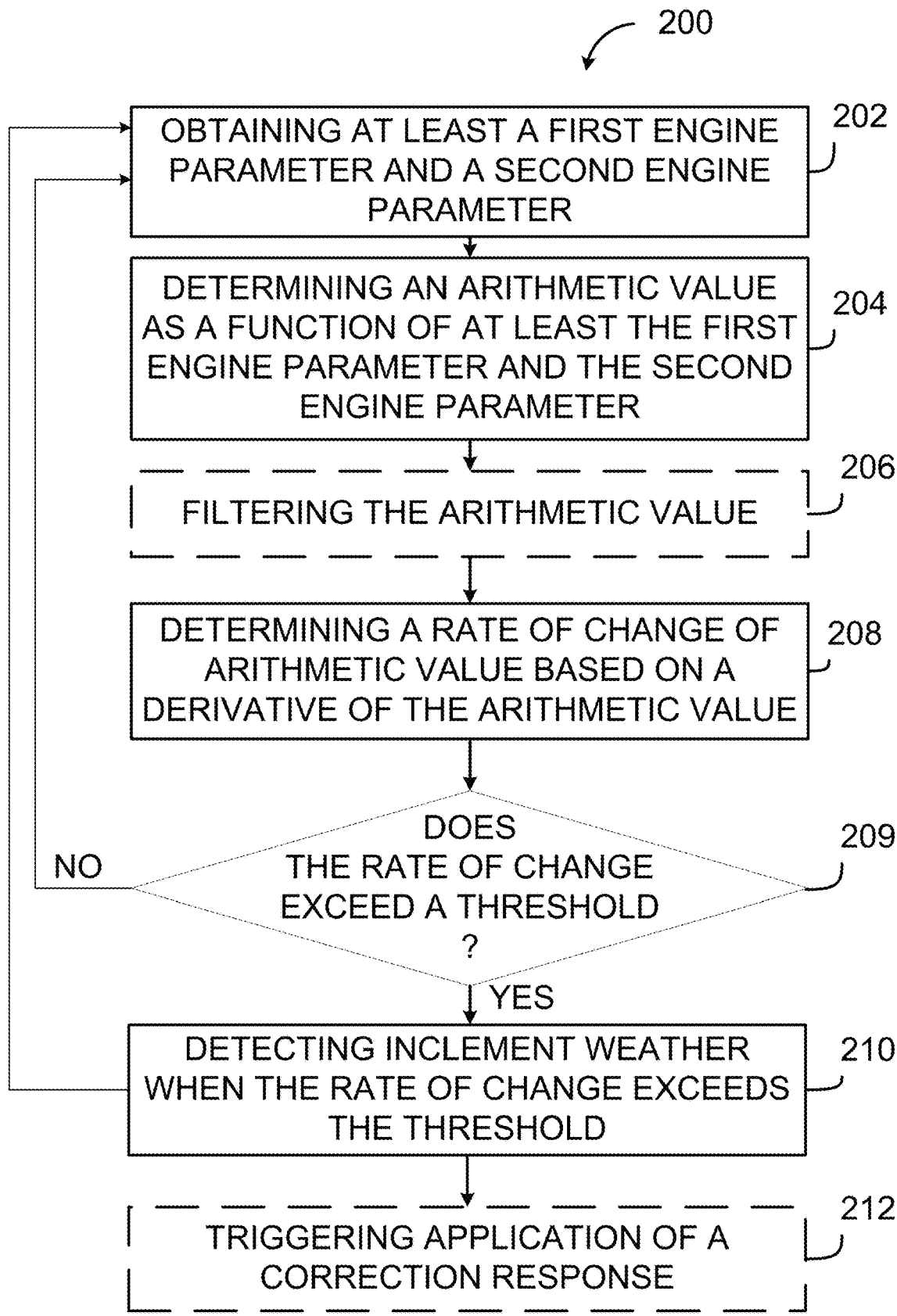
FIG. 2 is a flowchart illustrating an example method for detecting inclement weather from an engine in accordance with an embodiment.

With reference to FIG. 2, there is shown a flowchart illustrating an example method 200 for detecting inclement weather in the vicinity of an aircraft engine, such as engine 100 of FIG. 1. While the method 200 is described herein with reference to the engine 100 of FIG. 1, this is for example purposes. The method 200 may be applied to other types of engines depending on practical implementations.

At step 202, at least a first engine parameter and a second engine parameter are obtained, each engine parameter varies with changing weather conditions. Additional engine parameters may also be obtained, hereinafter referred to as any subsequent engine parameters. In other words, the obtained engine parameters may be two engine parameters or may be more than two engine parameters, such as three engine parameters, four engine parameters and so forth. The first engine parameter may be obtained from a first measuring device comprising one or more sensors configured for measuring the first engine parameter. Similarly, the second engine parameter and any subsequent engine parameters may be obtained from a second or subsequent measuring device comprising one or more sensors configured for measuring the second engine parameter or any subsequent engine parameters. The location of the sensors may vary depending on the practical implementation. In some embodiments, the sensors are pre-existing sensors of the engine 100. In some embodiments, the first engine parameter is continuously measured. Similarly, in some embodiments, the second engine parameter and/or any subsequent engine parameters are continuously measured. The first engine parameter, the second engine parameter and/or any subsequent engine parameters may be dynamically obtained in real time, or may be recorded regularly in accordance with any suitable time interval. Step 202 may comprise triggering an action to obtain the first engine parameter, the second engine parameter and/or any subsequent engine parameters whenever method 200 is initiated.

Alternatively, the first engine parameter, the second engine parameter and/or any subsequent engine parameters may be provided by an engine computer or an aircraft computer. In some embodiments, the engine computer or the aircraft computer may synthesize the first engine parameter, the second engine parameter and/or any subsequent engine parameters. In some embodiments, the first engine parameter may be obtained from the first measuring device, while the second engine parameter may be provided by the engine computer or the aircraft computer, or vice versa. In some embodiments, the first engine parameter, the second engine parameter and/or any subsequent engine parameter may be a calculated engine parameter determined from an arithmetic function of one or more engine parameters. For example, the first engine parameter, second engine parameter and/or any subsequent engine parameter, may be the summation, delta, product, quotient, exponent or other arithmetic function of multiple engine parameters.

The first engine parameter, the second engine parameter and any subsequent engine parameters may be any suitable parameters associated with the engine 100 that vary with changing weather conditions. The first engine parameter, the second engine parameter and/or any subsequent engine parameters may include, but is not limited to, one of temperature of the engine 100, pressure of the engine 100, ambient air temperature (Tamb), ambient air pressure (Baro), rotational speed of the low pressure shaft of the low pressure spool of the engine 100, rotational speed of the high pressure shaft of the high pressure spool of the engine 100, and fuel flow (WF) to the engine 100. In some embodiments, the first engine parameter, the second engine parameter and/or any subsequent engine parameters may be inter turbine temperature (ITT), which is the temperature of the exhaust gases between the high pressure and the low pressure turbines of the engine 100. In some embodiments, the rotational speed of the low pressure shaft may be a normalized rotational speed of the low pressure shaft (N1). In some embodiments, the rotational speed of the high pressure shaft may be a normalized rotational speed of the high pressure shaft (N2).

Temperature and/or pressure of the engine 100 may be obtained for a specific location of the engine 100. Accordingly, the first engine parameter may be at a first location of the engine 100. Similarly, the second engine parameter may be at a second location of the engine 100. The first location and the second location may be at a same or a different location of the engine 100. For example, the first engine parameter may be temperature at a first location of the engine 100 and the second engine parameter may be pressure at a second location of the engine 100, where the first location is proximate to the second location. By way of another example, the first engine parameter may be temperature at a first location of the engine 100 and the second engine parameter may be temperature at a second location of the engine 100, where the first location is different from the second location. Accordingly, the first engine parameter is different from the second engine parameter, as the first engine parameter and the second engine parameter may be different parameter types (e.g., temperature, pressure, etc.) or may be a same parameter type at different locations. Any subsequent engine parameter may be at any subsequent location of the engine 100, which may be a same or different location than the first and/or second location.

In accordance with a specific and non-limiting example of implementation, the first engine parameter is temperature at a first location of the engine and the second engine parameter is pressure at a second location of the engine. In accordance with another specific and non-limiting example of implementation, the first engine parameter is temperature at a first location of the engine and the second engine parameter is temperature at a second location of the engine. In accordance with another specific and non-limiting example of implementation, the first engine parameter is pressure at a first location of the engine and the second engine parameter is pressure at a second location of the engine. In accordance with another specific and non-limiting example of implementation, the first engine parameter is fuel flow to the engine and the second engine parameter is pressure at a second location of the engine. In accordance with another specific and non-limiting example of implementation, the first engine parameter is fuel flow to the engine and the second engine parameter is temperature at a second location of the engine. In accordance with another specific and non-limiting example of implementation, the first engine parameter is rotational speed of a low pressure shaft of a low pressure spool of the engine and the second engine parameter is rotational speed of a high pressure shaft of a high pressure spool of the engine.

Temperature and/or pressure of the engine 100 at a specific location of the engine 100 may be identified based on station numbering. Temperature at a specific location of the engine 100 may be denoted using a station number suffixed to the letter T. Similarly, pressure of the engine 100 at a specific location of the engine 100 may be denoted using a station number suffixed to the letter P. With additional reference to FIG. 3, an engine schematic diagram illustrates station numbering. While station number is described herein with reference to the engine schematic diagram illustrated in FIG. 3, this is for example purposes. The station number may be applied to other types of engines, and the station numbering may correspond to station numbering of one or more standards or industry conventions. Free stream conditions are identified as station number 0, where free stream refers to the air upstream of the engine 100. Engine intake front flange or leading edge is identified as station number 1. A first compressor front face is identified as station number 2. A last compressor exit face is identified as station number 3. A combustor exit plane is identified as station number 4. The last turbine exit face is identified as station number 5. The flow conditions upstream of an afterburner or mixer occur at station number 6. Station number 7 is at an inlet to a nozzle, station number 8 is at a nozzle throat and station number 9 is downstream of the nozzle throat or at an exhaust diffuser exit plane.

The station numbers 0, 1, 2, 3, 4, 5, 6, 7, 8 and 9 may be referred to as fundamental station numbering. Station numbers between the fundamental station numbers may be referred to as intermediate station numbers. Intermediate station numbers may be denoted using a second digit suffixed to an upstream fundamental station number, such as 12, 13, 14, 15, 16, 21, 24, 25, 31, 41, 43, 45, 46, 49, and the like.

Figure 3:
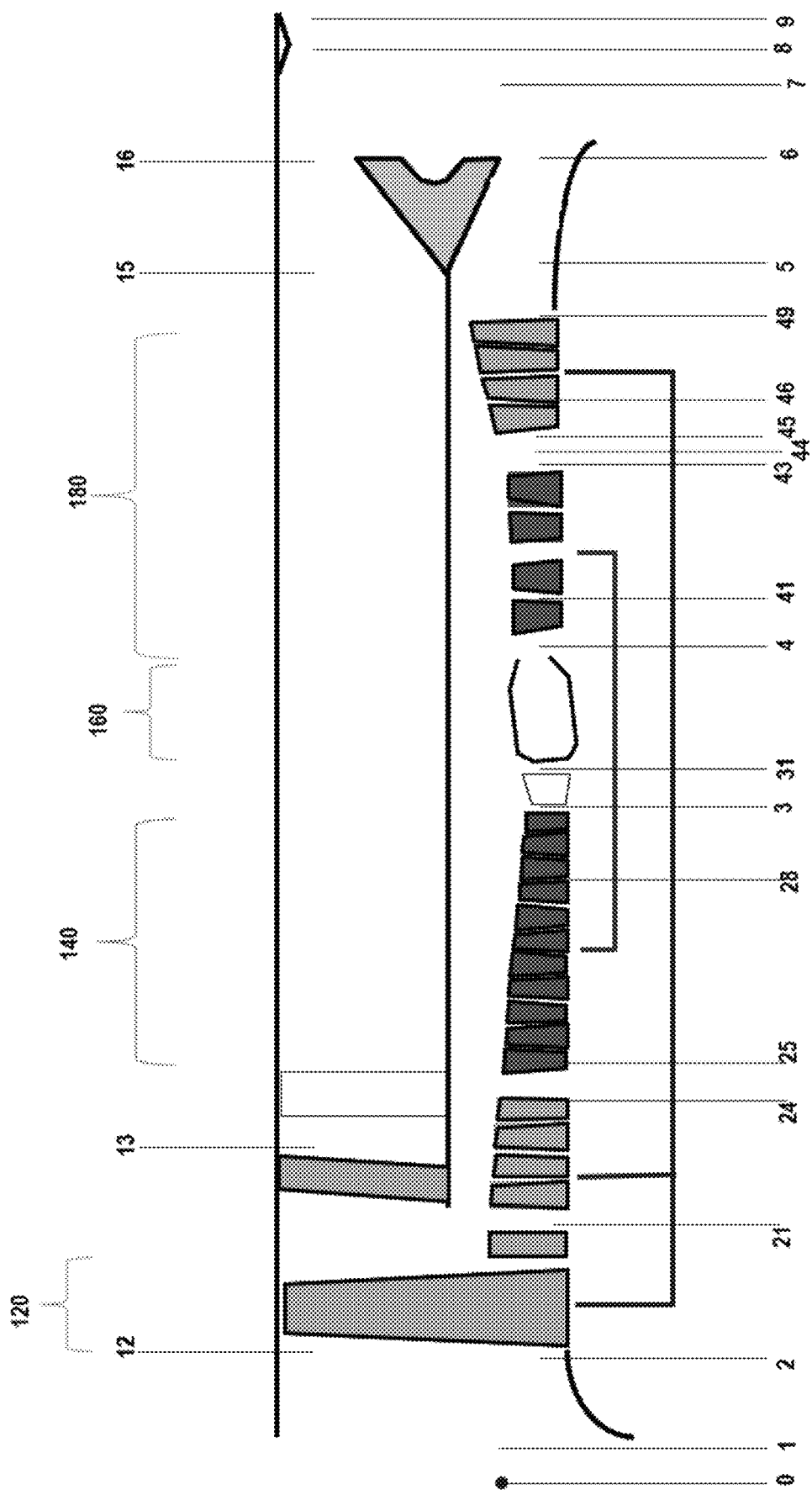
FIG. 3 is an engine schematic diagram illustrating station numbering.

The first engine parameter obtained at step 202 of FIG. 2 may be a temperature or pressure at any of the station numbers illustrated in FIG. 3. Similarly, the second engine parameter obtained at step 202 of FIG. 2 may be a temperature or pressure at any of the station numbers illustrated in FIG. 3. Any subsequent engine parameters obtained may be a temperature or pressure at any of the station numbers illustrated in FIG. 3. For example, the first engine parameter, the second engine parameter and/or any subsequent engine parameters may be one of T0, T1, T2, T3, T4, T44, T5, T6, T7, P2, P28, P31 and P6. As will be understood by a person skilled in the art, T0 is temperature at station 0 and refers to free stream temperature. T1 is temperature at station 1 and refers to engine intake temperature. T2 is temperature at station 2 and refers to compressor intake temperature. T3 is temperature at station 3 and refers to combustor intake temperature. T4 is temperature at station 4 are refers to turbine inlet temperature. T44 is temperature at station 44 and refers to high pressure turbine exit temperature. T5 is temperature at station 5 and refers to last turbine exit temperature. T6 is temperature at station 6 and refers to exhaust or afterburner intake temperature. T7 is temperature at station 7 and refers to nozzle inlet temperature. P2 is pressure at station 2 and refers to compressor intake temperature. P28 is pressure at station 28 and refers to the outtake temperature of an intermediate stage of the compressor. P31 is pressure at station 31 and refers to compressor outlet temperature. P6 is pressure at station 6 and refers to exhaust or afterburner intake pressure. The first engine parameter, the second engine parameter and/or any subsequent engine parameters may be burner pressure (PB) between stations 5 and 6.

By way of example, the first engine parameter may be at the first location and the second engine parameter may be at the second location, where the first location is at a same station number of the engine 100 as the second location. While the first engine parameter and the second engine parameter may be obtained at the same station number, the first engine parameter and the second engine parameter may be taken at different locations of the engine 100, as each station number may have multiple locations where an engine parameter may be obtained. By way of another example, the first engine parameter may be at the first location and the second engine parameter may be at the second location, where the first location is at a different station number of the engine 100 than the second location. In accordance with a specific and non-limiting example of implementation, the first engine parameter is temperature at station number 5 of the engine and the second engine parameter is pressure at station 5 of the engine. In accordance with another specific and non-limiting example of implementation, the first engine parameter is temperature at station number 5 of the engine and the second engine parameter is temperature at station number 2.

The first engine parameter, the second engine parameter and any subsequent engine parameters used may vary depending on type and/or configuration of the engine, the noise level of engine parameter(s), and the like. The selection of the engine parameters to use may be determined by computer simulation, modeling and/or processing. The selection of the engine parameters may be determined to minimize inclement weather detection time with no false detection. The computer simulation, modeling and/or processing may be pre-determined, may be done in real-time, and/or may be determined at regular/irregular intervals.

In accordance with a specific and non-limiting example of implementation, the first engine parameter is T5 and the second engine parameter is PB. In accordance with another specific and non-limiting example of implementation, the first engine parameter is T5 and the second engine parameter is T2. In accordance with yet another specific and non-limiting example of implementation, the first engine parameter is WF and the second engine parameter is PB. In accordance with a further specific and non-limiting example of implementation, the first engine parameter is N2 and the second engine parameter is N1.

Referring back to FIG. 2, at step 204, an arithmetic value as a function of at least the first engine parameter and the second engine parameter is determined. The arithmetic value varies with changing weather condition. The arithmetic value may be a function of the first engine parameter, the second engine parameter and any subsequent engine parameters. For example, the arithmetic value may be a function of two engine parameters, three engine parameters, four engine parameters and so forth. The arithmetic value be determined continuously in real time, or may be determined regularly in accordance with any suitable time interval. Accordingly, the arithmetic value varies as a function of time. The arithmetic value may be denoted as in equation (1a):

$$AV(t)=f(P_1(t),P_2(t)) \tag{1a},$$

where $P_{1(t)}$ refers to the first engine parameter as a function of time and $P_{2(t)}$ refers to the second engine parameter as a function of time. The arithmetic value may be denoted in various manners depending on the number engine parameters and the function for determining the arithmetic value from the engine parameters.

The function for determining the arithmetic value may be a ratio, a product, a summation, a quotient, exponent, a combination thereof and/or any other suitable arithmetic function of multiple engine parameters. For example, when the function for determining the arithmetic value comprises a ratio, the ratio can be determined by dividing the first engine parameter by the second engine parameter. The ratio may be denoted as in equation (1 b):

$$R(t) = \frac{P_1(t)}{P_2(t)}. \tag{1b}$$

In some embodiments, the first engine parameter in the numerator of the ratio increases with inclement weather and the second engine parameter in denominator of the ratio decreases with inclement weather, or vice versa. In accordance with a specific and non-limiting example of implementation, the arithmetic value is a ratio of T5 and PB. In accordance with another specific and non-limiting example of implementation, the arithmetic value is a ratio of T5 and T2. In accordance with yet another specific and non-limiting example of implementation, the arithmetic value is a ratio of WF and PB. In accordance with a further specific and non-limiting example of implementation, the arithmetic value is a ratio of N2 and N1. In accordance with another example, the ratio may be a ratio of ITT and PB, where the ITT is a calculated engine parameter. For example, the ITT may be calculated based on altitude, T5, N1 and N2.

By way of another example, the function for determining the arithmetic value comprises a product. The product can be determined by multiplying the first engine parameter by the second engine parameter. The product may be denoted as in equation (1c):

$$M(t)=P(t)_1 \times P(t)_2 \tag{1c}.$$

According to yet another example, the arithmetic value may a ratio of two products. For instance, the arithmetic value may be the ratio of T5 multiplied by N1 and T2 multiplied by N2 (i.e., (T5×N1)/(T2×N2)). In some embodiments, the engine parameters in the numerator of the ratio increase with inclement weather and the engine parameters in the denominator of the ratio decrease with inclement weather, or vice versa. In other words, a grouping of engine parameters in the numerator or the denominator may either increase or decrease in response to inclement weather. Accordingly, the selection of the engine parameters to use may be based on the numerator of a ratio having an increasing value with inclement weather and the denominator of the ratio having a decreasing value with inclement weather, or vice versa. The determination of the arithmetic value as a function of the engine parameters may vary depending on practical implementation.

At step 206, in some embodiments, the arithmetic value of the at least first engine parameter and second engine parameter is filtered to remove noise, as one or more of the first engine parameter and the second engine parameter may be noisy. Any suitable filter may be used. A digital filter of known or other type may be used. In some embodiments, a first order filter may be used. In some embodiments, a second order filter is used. In some embodiments, a third order or higher filter is used. Other types of filters are contemplated. The filter takes as an input the arithmetic value AV(t) and outputs a filtered arithmetic value $AV_f(t)$. Alternatively, the first engine parameter, the second engine parameter and/or any subsequent engine parameters may be separately filtered prior to step 204. Depending on practical implementation, filtering of the arithmetic value, the first engine parameter, the second engine parameter and/or any subsequent engine parameters may be omitted.

At step 208, a rate of change of the arithmetic value is determined based on a derivative of the arithmetic value. The rate of change of the arithmetic value may be determined by taking a difference between the arithmetic value AV(t) at a second time $t_2$ and a first time $t_1$, where the difference is divided by a time interval Δt between the second time $t_2$ and the first time $t_1$. The rate of change may be determined continuously in real time, or may be determined regularly in accordance with any suitable time interval, such as the time interval Δt. The rate of change of the arithmetic value may be denoted as in equation (2):

$$RoC = \frac{AV(t_2) - AV(t_1)}{\Delta t}, \quad (2)$$

where $\Delta t = t_2 - t_1$.

Equation (2) corresponds to a derivative calculation of the arithmetic value, where time interval Δt is a time interval for the derivative. The time interval Δt may be determined based on the first engine parameter, the second engine parameter and/or any subsequent engine parameters.

For example, if the first engine parameter is T5, the second engine parameter is PB and the arithmetic value is determined from a ratio of the first engine parameter and the second engine parameter, then the time interval Δt may be set at a first specific time interval $\Delta t_1$ (e.g., 0.5 s), which may be determined based on T5 and PB. By way of another example, if the first engine parameter is T5, the second engine parameter is T2 and the arithmetic value is determined from a ratio of the first engine parameter and the second engine parameter, then the time interval Δt may be set at a second specific time interval $\Delta t_2$ (e.g., 0.2 s), which may be determined based on T5 and T2. The aforementioned first and second time intervals may vary depending on practical implementation and the above values are provided only for example purposes.

The time interval Δt used may vary depending on type and/or configuration of the engine, the noise level of engine parameter(s), and the like. The time interval Δt may be determined by computer simulation, modeling and/or processing. The time interval Δt may be pre-determined, may be determined in real-time, and/or may be determined at regular/irregular intervals. For example, the time interval may be determined based on observed differences of test results with various intervals with and without inclement weather. A minimum time interval may be based on the slowest recording/synthesized rate of the parameters. The time interval Δt used may vary depending on the arithmetic function.

If the arithmetic value is filtered at step 206, then at step 208, determining the rate of change of the arithmetic value comprises determining a rate of change of the filtered arithmetic value based on a derivative of the filtered arithmetic value. For example, the arithmetic value AV(t) used in equation (2a) may be replaced with the filtered arithmetic value $AV_f(t)$.

At step 209, the rate of change RoC is compared to a threshold to determine if the rate of change RoC exceeds the threshold. The comparison of the rate of change RoC to the threshold may be determined continuously in real time, or may be determined regularly in accordance with any suitable time interval, such as the time interval Δt.

The threshold may be any suitable threshold. The threshold may depend on the first engine parameter, the second engine parameter and/or any subsequent engine parameters. The threshold may be predetermined based on computer simulation or the like. The threshold may be determined based on the first engine parameter, the second engine parameter and/or any subsequent engine parameters such that threshold correspond to a value of a rate of change indicative of inclement weather conditions. For example, if the first engine parameter is T5, the second engine parameter is PB and the arithmetic value is determined from a ratio of the first engine parameter and the second engine parameter, then the threshold may be set at a first specific threshold value, which may be determined based on T5 and PB. By way of another example, if the first engine parameter is T5, the second engine parameter is T2 and the arithmetic value is determined from a ratio of the first engine parameter and the second engine parameter, then the threshold may be set at a second specific threshold value, which may be determined based on T5 and T2. For example, the threshold for inclement weather detection for a ratio of T5/T2 may be set at −0.05. By way of another example, the threshold for inclement weather detection for a ratio of T5/PB may be set at −0.10. The aforementioned threshold values may vary depending on practical implementation and the above values are provided only for example purposes.

The threshold used may vary depending on type and/or configuration of the engine, the noise level of engine parameter(s), and the like. The threshold used may vary depending on the arithmetic function used to determine the arithmetic value. The threshold may be determined by computer simulation, modeling and/or processing. For example, the threshold may be determined based on zero false detections and earliest positive detection from inclement weather test data. The threshold may be pre-determined, may be determined in real-time, and/or may be determined at regular/irregular intervals.

At step 210, inclement weather is detected when the rate of change exceeds the threshold. If the rate of change does not exceed the threshold (step 209), then the method 200 continues to obtain at least the first engine parameter and the second engine parameter (step 202). In some embodiments, an indication of inclement weather being detected may be communicated to a display or other suitable device to notify the pilot and/or any other crew member.

At step 212, in some embodiments, application of a corrective response is triggered to correct the undesirable effects resulting from the inclement weather conditions (e.g. prevent flameout). Some example corrective responses include, but are not limited to, increasing fuel flow, changing a position of one or more bleed-off valve (BOV), changing a position of one or more inlet guide vane (IGV), altering one or more bleed flow, and any combination thereof.

In some embodiments, the method 200 continues to obtain at least the first engine parameter and the second engine parameter (step 202) after inclement weather has been detected a first time at step 210. If the rate of change of the arithmetic value subsequently decreases below the threshold, inclement weather is no longer detected. In some embodiments, the method 200 may be initiated by the pilot. In some embodiments, the method 200 may be automatically initiated. In some embodiments, the method 200 is stopped after a specific period of time from initiation of the method 200. In some embodiments, the method 200 is stopped after a pilot action disables the method 200.

It should be appreciated that by using method 200 a detection time for detecting inclement weather may be less than previous approaches. For instance, by selecting the first engine parameter and the second engine parameter such that the numerator and the denominator of the ratio change in opposite directions during inclement weather conditions, this may amplify the magnitude of change and may allow for a faster detection time. For example, it has been determined that if the first engine parameter is T5 and the second engine parameter is PB or if the first engine parameter is T5 and the second engine parameter is T2, the numerator and the denominator of the ratio may change in opposite directions during inclement weather conditions.

Figure 4:
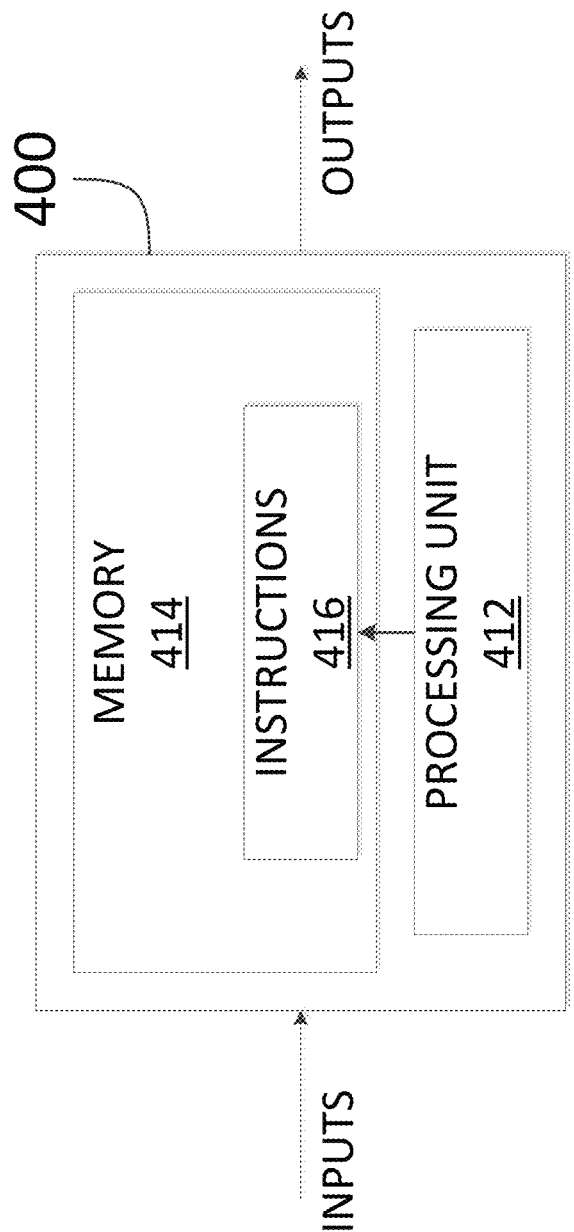
FIG. 4 is a block diagram of an example computing system for implementing the method of FIG. 2 in accordance with an embodiment.

With reference to FIG. 4, the method 200 may be implemented by a computing device 400, comprising a processing unit 412 and a memory 414 which has stored therein computer-executable instructions 416. The processing unit 412 may comprise any suitable devices configured to implement the system such that instructions 416, when executed by the computing device 400 or other programmable apparatus, may cause the functions/acts/steps of the method 200 as described herein to be executed. The processing unit 412 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 414 may comprise any suitable known or other machine-readable storage medium. The memory 414 may comprise non-transitory computer readable storage medium, for example, but not limited to, an electronic, magnetic, optical, electromagnetic, infrared, or semiconductor system, apparatus, or device, or any suitable combination of the foregoing. The memory 414 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 414 may comprise any storage means (e.g., devices) suitable for retrievably storing machine-readable instructions 416 executable by processing unit 412. In some embodiments, the computing device 400 can be implemented as part of a full-authority digital engine controls (FADEC) or other similar device, including electronic engine control (EEC), engine control unit (ECU), and the like.

The methods and systems for detection described herein may be implemented in a high level procedural or object oriented programming or scripting language, or a combination thereof, to communicate with or assist in the operation of a computer system, for example the computing device 400. Alternatively, the methods and systems for detection may be implemented in assembly or machine language. The language may be a compiled or interpreted language. Program code for implementing the methods and systems for detection may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems for detection may also be considered to be implemented by way of a non-transitory computer-readable storage medium having a computer program stored thereon. The computer program may comprise computer-readable instructions which cause a computer, or in some embodiments the processing unit 412 of the computing device 400, to operate in a specific and predefined manner to perform the functions described herein.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

Figure 5:
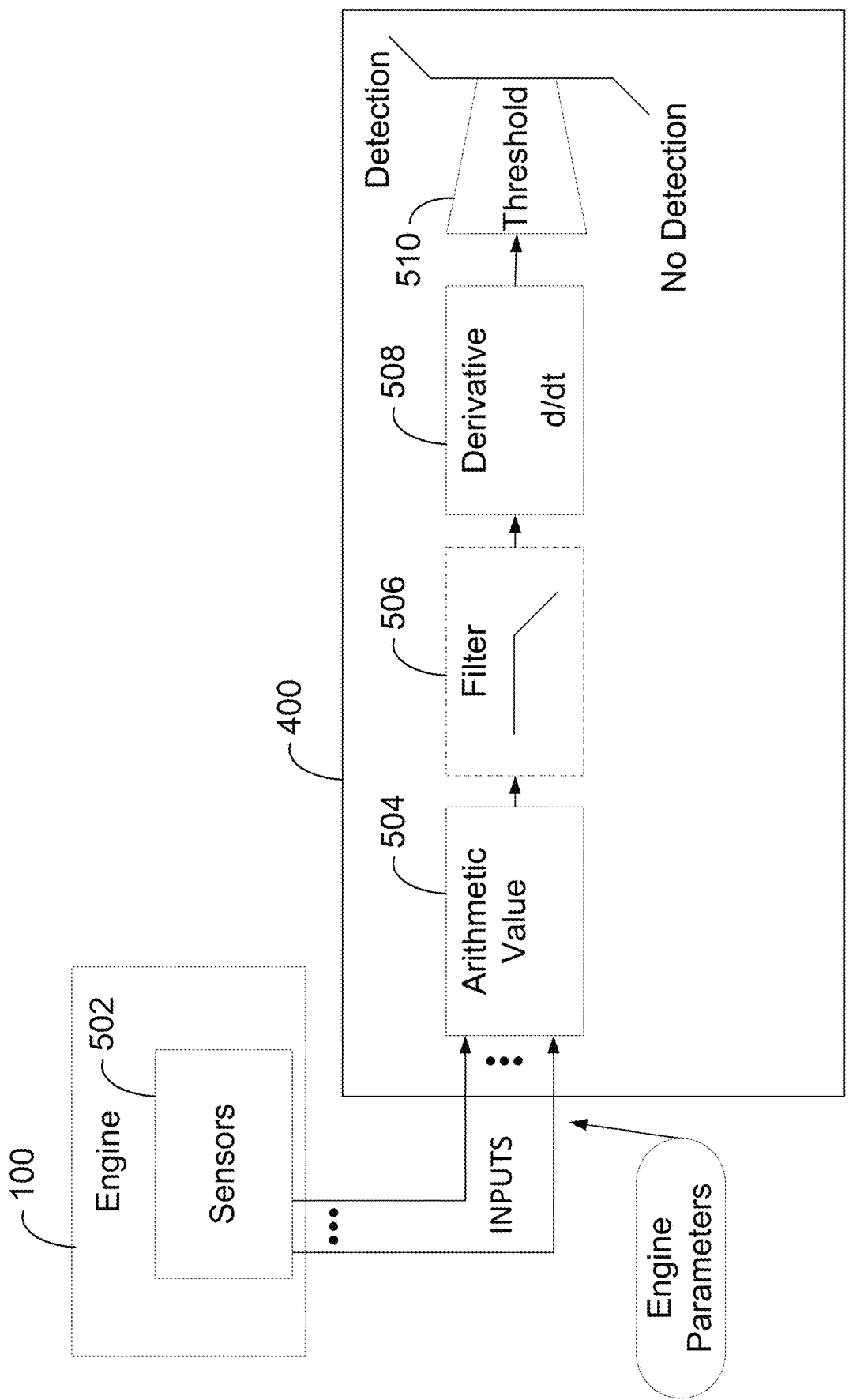
FIG. 5 is a block diagram of the example computing system and the engine in accordance with an embodiment.

With reference to FIG. 5, a block diagram illustrates the computing device 400 and the engine 100, in accordance with an embodiment. In the illustrated embodiment, sensors 502 are used to measure the first engine parameter, the second engine parameter and any subsequent engine parameters. The sensors 502 may comprise one or more of a temperature sensor, pressure sensor, rotational speed sensor, fuel flow sensor and/or any other suitable sensor. In the embodiment illustrated in FIG. 5, the inputs to the computing device 400 are at least two engine parameters. The computing device 400 may implement an arithmetic value unit 504, a filter unit 506 (optional), a derivative unit 508, and a threshold unit 510, such as illustrated in FIG. 5. The arithmetic value unit 504 uses the engine parameters to determine the arithmetic value, according to step 204 of method 200. A filter unit 506 (optional) filters the arithmetic value, according to step 206 of method 200. A derivative unit 508 determines a rate of change of the arithmetic value, according to step 208 of method 200. A threshold unit 510 detects inclement weather, according to step 210 of method 200.

In some embodiments, the computing device 400 may synthesise the first engine parameter, the second engine parameter and/or any subsequent engine parameters. For example, the sensors may not measure the first engine parameter and/or the second engine parameter directly, rather other engine parameter(s) may be obtained by one or more sensors or from the aircraft computer or engine computer to determine the first engine parameter and/or the second engine parameter. Accordingly, the first engine parameter and/or the second engine parameter may be a synthesized temperature parameter, a synthesized pressure parameter, a synthesized engine rotational speed parameter, a synthesized fuel flow and/or any other suitable synthesized parameter.

In some embodiments, vibration and/or microphone sensors may be used to obtain the first engine parameter, the second engine parameter and/or any subsequent engine parameter.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure.

Various aspects of the methods and systems for detection may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be obvious to those skilled in the art that changes and modifications may be made without departing from this invention in its broader aspects. The scope of the following claims should not be limited by the embodiments set forth in the examples, but should be given the broadest reasonable interpretation consistent with the description as a whole.

What is claimed is:

1. A method for detecting and correcting effects of inclement weather occurring in the vicinity of an aircraft engine, the method comprising:
   obtaining at least a first engine parameter and a second engine parameter, each engine parameter varying with changing weather conditions;
   determining a ratio of the first engine parameter and the second engine parameter, the ratio varying with changing weather conditions;
   determining a rate of change of the ratio based on a derivative of the ratio;
   detecting inclement weather in the vicinity of the aircraft engine when the rate of change of the ratio exceeds a threshold; and
   in response to detecting the inclement weather, causing at least one corrective response to be applied to the engine for preventing engine flameout.

2. The method of claim 1, wherein obtaining at least the first engine parameter and the second engine parameter comprises measuring at least the first engine parameter and the second engine parameter.

3. The method of claim 1, wherein obtaining at least the first engine parameter and the second engine parameter comprises obtaining at least one calculated engine parameter determined from an arithmetic function of one or more engine parameters.

4. The method of claim 1, wherein the first engine parameter is temperature at a first location of the engine and the second engine parameter is pressure at a second location of the engine.

5. The method of claim 4, wherein the first engine parameter is temperature at station number 5 of the engine and the second engine parameter is pressure at station 5 of the engine.

6. The method of claim 1, wherein the first engine parameter is temperature at a first location of the engine and the second engine parameter is temperature at a second location of the engine.

7. The method of claim 6, wherein the first engine parameter is temperature at station number 5 of the engine and the second engine parameter is temperature at station number 2.

8. The method of claim 1, wherein the first engine parameter is pressure at a first location of the engine and the second engine parameter is pressure at a second location of the engine.

9. The method of claim 1, wherein the first engine parameter is fuel flow to the engine and the second engine parameter is pressure at a second location of the engine.

10. The method of claim 1, wherein the first engine parameter is fuel flow to the engine and the second engine parameter is temperature at a second location of the engine.

11. The method of claim 1, wherein the first engine parameter is rotational speed of a low pressure shaft of a low pressure spool of the engine and the second engine parameter is rotational speed of a high pressure shaft of a high pressure spool of the engine.

12. The method of claim 1, wherein the first engine parameter increases with inclement weather and the second engine parameter decreases with inclement weather.

13. The method of claim 1, further comprising filtering the ratio to obtain a filtered ratio, and wherein determining the rate of change of the ratio comprises determining a derivative of the filtered ratio.

14. The method of claim 1, wherein a time interval of the derivative depends on at least the first engine parameter and the second engine parameter.

15. The method of claim 1, wherein the threshold depends on at least the first engine parameter and the second engine parameter.

16. A system for detecting and correcting effects of inclement weather occurring in the vicinity of an aircraft engine, the system comprising:
    at least one processing unit; and
    a non-transitory computer-readable memory having stored thereon program instructions executable by the at least one processing unit for:
       obtaining at least a first engine parameter and a second engine parameter, each engine parameter varying with changing weather conditions;
       determining a ratio of the first engine parameter and the second engine parameter, the ratio varying with changing weather conditions;
       determining a rate of change of the ratio based on a derivative of the ratio;
       detecting inclement weather in the vicinity of the aircraft engine when the rate of change of the ratio exceeds a threshold; and
       in response to detecting the inclement weather, causing at least one corrective response to be applied to the engine for preventing engine flameout.

17. The system of claim 16, wherein the program instructions are executable by the at least one processing unit for obtaining at least the first engine parameter and the second engine parameter comprising measuring at least the first engine parameter and the second engine parameter.

18. The system of claim 16, wherein the program instructions are executable by the at least one processing unit for obtaining at least the first engine parameter and the second engine parameter comprising obtaining at least one calculated engine parameter determined from an arithmetic function of one or more engine parameters.

19. The system of claim 16, wherein the first engine parameter is temperature at a first location of the engine and the second engine parameter is pressure at a second location of the engine.

20. The system of claim 19, wherein the first location is at a same station number of the engine as the second location.

21. The system of claim 16, wherein the first engine parameter is temperature at a first location of the engine and the second engine parameter is temperature at a second location of the engine.

22. The system of claim 21, wherein the first location is different from the second location.

23. The system of claim 16, wherein the first engine parameter is pressure at a first location of the engine and the second engine parameter is pressure at a second location of the engine.

24. The system of claim 16, wherein the first engine parameter is fuel flow to the engine and the second engine parameter is pressure at a second location of the engine.

25. The system of claim 16, wherein the first engine parameter is fuel flow to the engine and the second engine parameter is temperature at a second location of the engine.

26. The system of claim 16, wherein the first engine parameter is rotational speed of a low pressure shaft of a low pressure spool of the engine and the second engine parameter is rotational speed of a high pressure shaft of a high pressure spool of the engine.

* * * * *